United States Patent
Mahoney et al.

[11] Patent Number: 6,094,836
[45] Date of Patent: Aug. 1, 2000

[54] DUAL AIR DRYER WITH SPIN-ON CARTRIDGES

[75] Inventors: Thomas John Mahoney, Elmwood Park; Monte Salzman, Lake in the Hills, both of Ill.

[73] Assignee: SKF USA Inc., Elgin, Ill.

[21] Appl. No.: 09/290,717

[22] Filed: Apr. 12, 1999

[51] Int. Cl.[7] .................................................. F26B 21/06
[52] U.S. Cl. .................................................................. 34/80
[58] Field of Search ........................... 34/548, 557, 562, 34/565, 566, 80, 81, 82; 96/109, 119, 130, 140, 183; 137/112, 627.5

[56] References Cited

U.S. PATENT DOCUMENTS

| | | | |
|---|---|---|---|
| 2,790,505 | 4/1957 | Dow | 95/124 |
| 4,052,178 | 10/1977 | Frantz . | |
| 4,065,096 | 12/1977 | Frantz et al. . | |
| 4,108,617 | 8/1978 | Frantz . | |
| 4,468,239 | 8/1984 | Frantz . | |
| 4,519,819 | 5/1985 | Frantz . | |
| 4,601,114 | 7/1986 | Noguchi | 34/473 |
| 4,692,175 | 9/1987 | Frantz . | |
| 4,891,051 | 1/1990 | Frantz . | |
| 5,926,969 | 7/1999 | Crawford et al. | 34/80 |
| 5,930,910 | 8/1999 | Trapp et al. | 34/80 |
| 5,961,698 | 10/1999 | Dossaji et al. | 34/80 |
| 5,983,516 | 11/1999 | Trapp et al. | 34/80 |

*Primary Examiner*—Stephen Gravini
*Attorney, Agent, or Firm*—James T. FitzGibbon; Vedder, Price, Kaufman & Kammholz

[57] ABSTRACT

An air dryer having dual, spin-on canister assemblies. The unit also includes first and second valve bodies, each containing a moist air inlet valve, a dried air outlet valve and an exhaust and drain valve assembly. A single control valve assembly allows the exhaust valves to open in response to air pressure and close in the absence of pressure. The moist air inlet valves are responsive to high external air pressure for biasing the valves open. The dried air outlet valves have a small orifice therein to allow air to bleed therethrough when the valves are closed. The canisters each include inner and outer imperforate sleeves, and passages arranged such that incoming air passes between the sleeves, through the desiccant and out the dry air outlet valve. When the control valve shifts, the air flow is reversed and the desiccant is regenerated.

25 Claims, 4 Drawing Sheets

DUAL AIR DRYER WITH SPIN-ON CARTRIDGES

BACKGROUND OF THE INVENTION

The present invention relates generally to desiccator assemblies, and more particularly to a twin tower type desiccator having two spin on dryer units each containing a volume of desiccant within a bag, which simplifies their removal when they ultimately become contaminated and no longer useful.

Operating any of a number of tools using compressed air for power must be done with dry air. The reason for having dry air is that the turbines operating the tools do not tolerate liquid water in their turbines, nor even air which is relatively high in water vapor content. Consequently, it is highly desirable to use air that has been virtually completely dried. The problem of moisture in compressed air systems is well-known. It is known, for example, that the reason that compressed air contains a great deal of moisture is that the process of compressing the air concentrates the same amount of moisture in a much smaller volume, thus raising the relative humidity of the compressed air.

Consequently, with air operating at a high degree of compression, there is a substantial increase in the relative humidity. If air, for example, is compressed at or above 200 psi, the amount of moisture therein can become very great. Accordingly, it is necessary when operating the air tools which have a requirement for dry air, to use some means of drying ambient air until its relative humidity is close to zero.

Another problem with relatively moist shop air arises in spray painting. For this purpose, almost totally dry air is desirable. If not, moisture in the air will condense with the paint being sprayed, and the water being insoluble in the paint, will result in a bubbly or spotted, unacceptable appearance.

Moreover, certain mechanical work, such as overhauling automatic transmissions, requires a particularly dry environment, inasmuch as the moisture may affect bonding of the friction materials used in clutches or other parts.

In addition to being dry, the air used to power air tools should be finely filtered to remove as many solid contaminants as possible, for obvious reasons.

Accordingly, it is an object of the invention to provide an improved air dryer, and an improved system for providing dry shop air to a plurality of tools serviced by many air lines.

Another object of the invention is to provide an air dryer having dual towers, each of which contains a desiccant in a cartridge of the spin-on variety to facilitate changing the housing and its contents when necessary.

Yet another object of the invention is to provide a cartridge which provides a filter for particulate materials and a tortuous path for the air which is to be directed to and through the desiccator.

Still another object of the invention is to provide an air dryer wherein the desiccant is contained in bags which are in turn contained in a cylindrical housing, which means the desiccant may be very finely subdivided for maximum effectiveness, and yet not be subject to leaking from its container.

A further object of the invention is to provide an air dryer containing twin towers in which, when one tower of the dryer is serving to dry incoming air, the other tower uses a very small portion of that air to create a regenerating cycle for the desiccant contained in the second tower.

A still further object of the invention is to provide a regeneration cycle in the second air dryer tower using air from the first air dryer tower which runs in an opposite direction from the first air dryer and which, once reverse-cycled, is exhausted from the bottom of the housing with its accumulated moisture, via an air operated valve and muffler.

An additional object of the invention is to provide a system of controls whereby most air goes to an active dryer whereas a minor amount of air goes into the regeneration cycle and in turn is controlled by air pressure which operates the valve that allows the moist air to exit the passive or regenerating air dryer.

Another object of the invention is to provide an air dryer which includes a micrologic or other timer operable by electricity and which controls the relative flow of control air between the twin units, and allows bleeding air to the atmosphere.

Yet another object of the invention is to provide an air dryer wherein the exhausted air from regeneration is allowed to exit through a muffler and a valve controlled by the micrologic timer.

Another object of the invention is to provide an air dryer with an inlet valve having an operating cycle in which the valve is kept open by air pressure during an inlet cycle and which valve includes a spring helping to bias the valve closed in the absence of a substantial static pressure biasing the valve open.

Still another object of the invention is to provide a simplified, spinon system of cartridge removal and replacement, which may be used only every year or two.

A further object of the invention is to provide a system wherein all essential elements of the air dryers are positioned so as to be readily available for maintenance, replacement, and repair.

A still further object of the invention is to provide a dual dryer which achieves economy and which is adaptable to a large variety of applications.

These and other objects and advantages of the present invention are achieved in practice by providing a dual cartridge desiccator system wherein air is admitted into one cartridge after passing through a filter and around the exterior of the desiccant cartridge and thereafter proceeds down and through the desiccant cartridge, exiting by way of a valve to an outlet line, while the other side is regenerated by a small amount of bleed air entering the cartridge and flowing backwards through the desiccant contained in the cartridge and ultimately out a drain port controlled by a valve opened by air pressure, and thus operates the cycle in the opposite direction, all without causing an interruption or a loss of air pressure to the main supply.

The invention also achieves its objects by providing an electrically operated timer whereby air pressure is directed to a control for an exhaust valve for wet air and also to the inlet valve for air to be dried, while also providing auxiliary functions.

The manner in which the invention achieves its objects and other objects which are inherent in the invention will become more clearly apparent when reference is made to the following description of the preferred embodiments of the invention set forth by way of example and shown in the accompanying drawings in which like reference numbers indicate corresponding parts throughout.

DESCRIPTION OF THE PREFERRED EMBODIMENTS OF THE INVENTION

While it is anticipated that the invention may take on different forms and may utilize different components in carrying out its objects, an embodiment of the invention will be shown which includes a number of novel features and arrangements of parts rendering them capable of simple and reliable operation in use and having desiccant bags or the like used in the dryer and capable of replacement with spin-on type cartridges.

Figure 1:
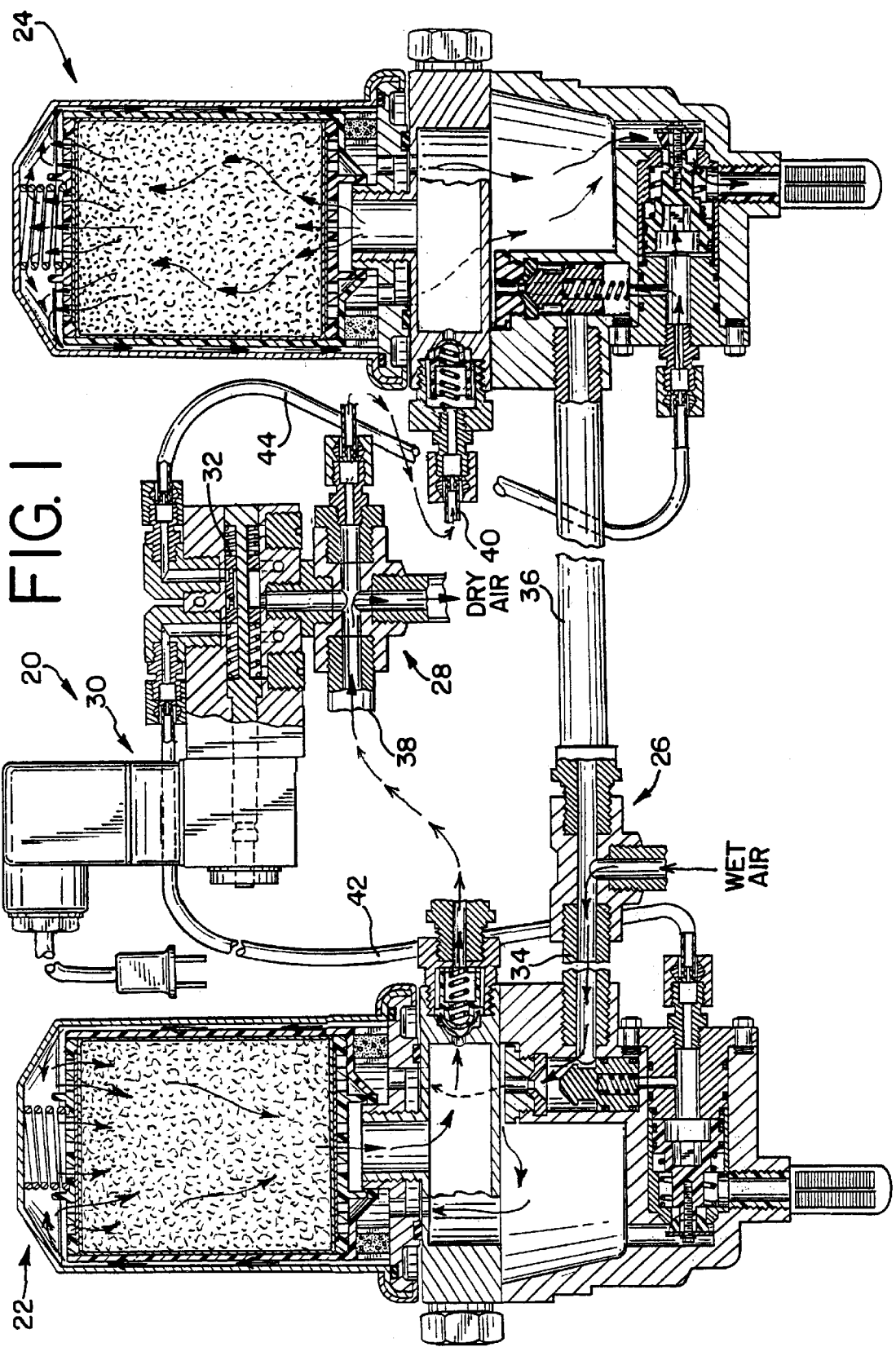
FIG. 1 is a vertical sectional view of a twin opposed air dryer assembly, with arrows showing the flow of moist air into one side of the desiccant assembly and showing the valves allowing dry air to enter and allow regeneration of the right-hand side desiccant unit.

Referring now to the drawings in greater detail, FIG. 1 shows an air dryer assembly of the invention 20 to include several major components. These include a left-hand desiccator sub-assembly generally designated 22, a right-hand desiccator sub-assembly generally designated 24, a three-way fitting generally designated 26, for moist air coming from a compressor (not shown), a four-way fitting for outlet air 28, a so-called micro logic timer 30, shown to be in controlling relation to a multi-port spool valve assembly 32 in communication with the four-way fitting 28.

Other components include compressed air inlet lines 34, 36, respectively, for the left- and right-hand desiccator sub-assemblies 22, 24, dry air outlet lines 38, 40 for the air coming from the desiccators 22, 24, and control air inlet lines 42, 44 for changing or maintaining the operation of the left- and right-hand side desiccator sub-assemblies.

According to the invention, the desiccator sub-assemblies themselves are essentially mirror image, identical units. When one is drying a large volume of air, the opposite unit takes a small amount of air and regenerates the desiccant held within it. Upon operation of the timer 30, the valve 32 shifts. This reverses the operation so that the left-hand desiccator is regenerated and drained, and the right-hand desiccator is activated in the drying mode. In this mode, the left-hand air line 42 is pressurized to vent the water/vapor, and the pressure in the right-hand air line is vented to the atmosphere, then closing the drain valve. This sequencing operation takes place periodically, for example, every three to five minutes or more, depending on the setting of the timer 30.

Figure 2:
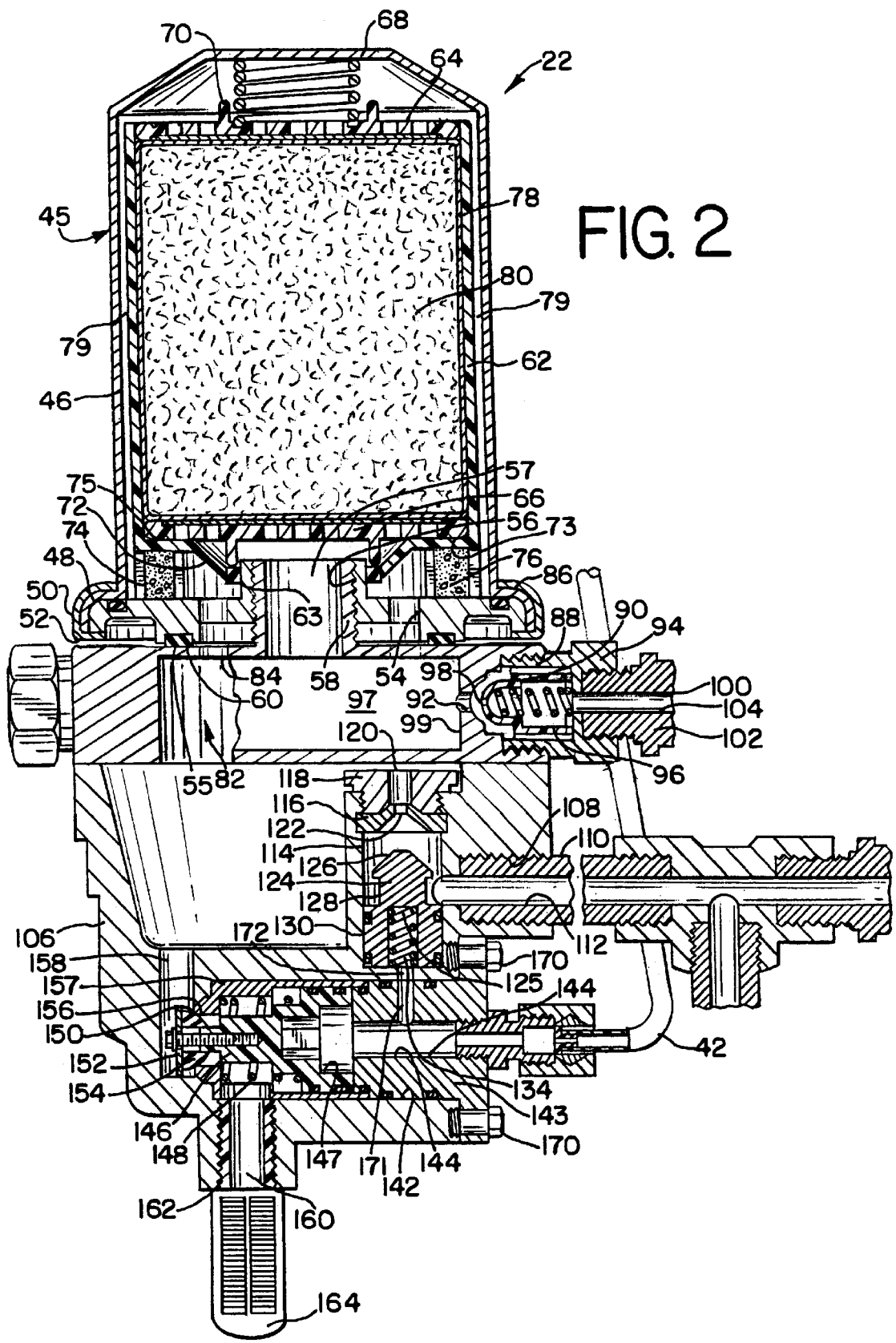
FIG. 2 is a vertical sectional view, on a somewhat larger scale, showing the left-hand portion of the dryer assembly in one operative mode thereof, namely, drying incoming moist air.
Figure 3:
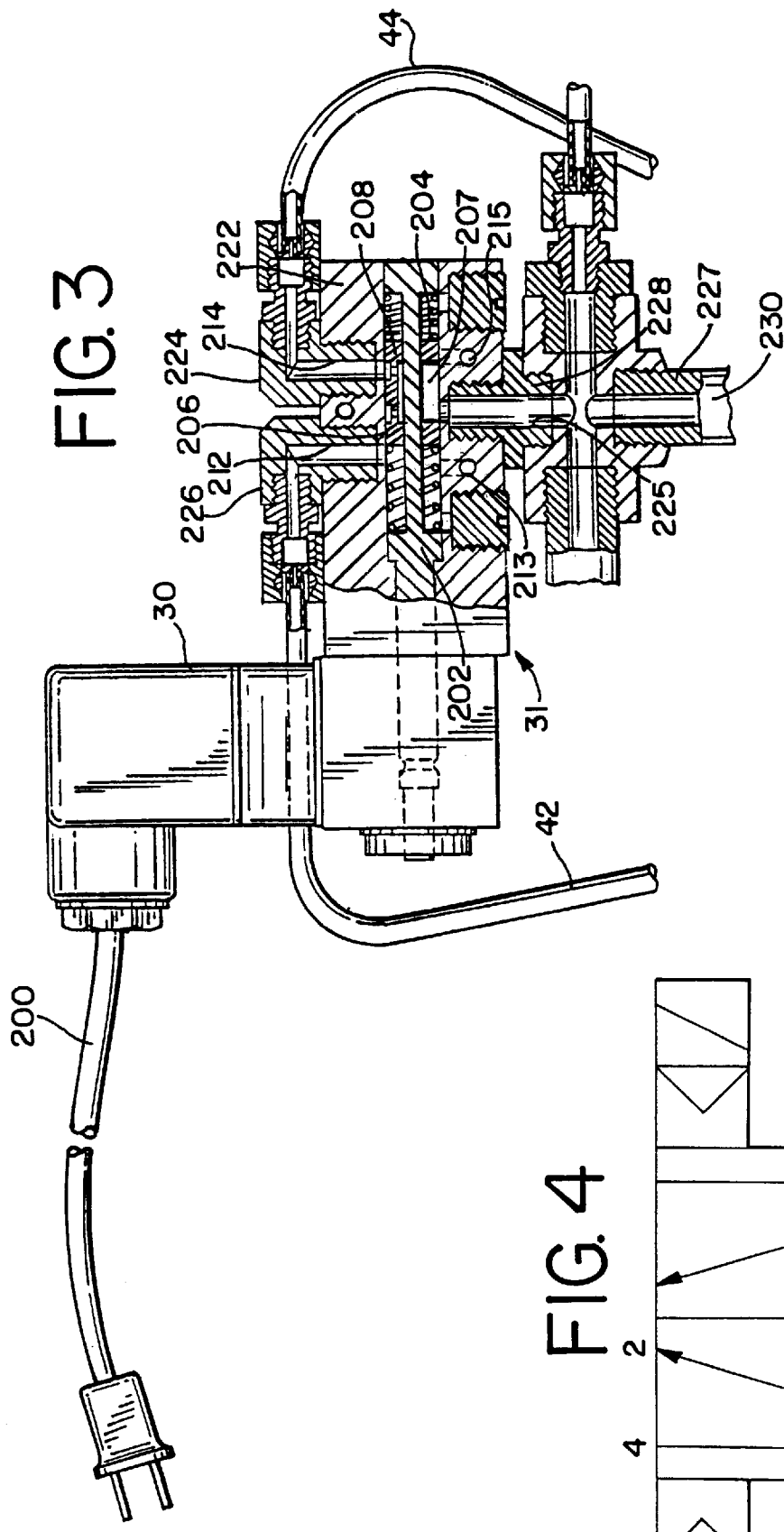
FIG. 3 is a further enlarged view, showing the operation of the MLT (micro logic timer) valve associated with the unit and controlling cycling between air drying and desiccant regeneration modes.

Referring now to FIG. 2, there is shown an enlarged view of the left-hand desiccator sub-assembly 22. This unit is shown to include an exterior imperforate canister assembly generally designated 45 including a housing 46 having a lower margin 48 retained in place by a circumferentially continuous circular ring 50 which includes a rolled inward margin 52. This margin 52 engages the main bottom plate 54 of the canister 45, which is threaded as at 56. These threads 56 engage a threaded standpipe 58, which serves as an upward extension of the housing 60 for the valves. A gasket 55 is trapped within a groove 57 in the plate 54 and this gasket 55 engages the upper surface of the housing 60 to seal the canister 45 thereagainst. Consequently, the entire canister 45 is a spin-on, spin-off type for ready serviceability; however, in normal use, the need for changing the desiccant interval might arise every two years or so.

The other elements of the canister 45 surround and enclose a plastic desiccant holding sleeve 62 which includes plastic, identical upper and lower end foraminous covers 64, 66. The upper end cover 64 is held downwardly in place within the sleeve 62 by a spring 68 which has one end engaging the upper surface of the housing 46. The end cover 64 includes a spring retaining collar 70 formed therein.

The lowermost, radially inwardly extending portion 72 of the sleeve 62 extends inwardly and downwardly towards the threaded portion of the bottom plate 54, where it ends in a gasket 63 engaging the plate 54. A plurality of spaced apart feet 74, 75 are formed integrally with the sleeve; the feet 74, 75 are disposed respectively along radially inner and outer circular paths spaced apart from each other. One path is shown as being concentric with the outer edge of the sleeve 62 and the other path lies somewhat radially inwardly thereof. They are spaced apart from each other by an imperforate band 73 of material, with which the radially imminent portion 72 of the sleeve closes off the bottom end of the sleeve 62. The feet 74, 75, which also serve to contain a secondary filter 76, are spaced apart circumferentially by intervals of approximately a length equal to their width to allow for air flow between them.

Located inside the housing formed by the combination of the imperforate sleeve 62 and the foraminous top and bottom walls 64, 66 is a bag 78 filled with a granular desiccant powder 80, preferably of the molecular sieve type. The molecular sieve is a well-known type, for example a molecular sleeve, having a very great surface area with respect to its volume, and is made from an activated clay material with an inert binder. In use, the bottom plate 54 is fastened to the exterior cover 46 by the ring 50, and all of the elements held therebetween are arranged to spin on to the standpipe 58 via the threads 56.

Referring now to the valve housing 60, this unit preferably has two chambers, a moist air chamber generally designated 82 and a dried air chamber 97. The moist air chamber 82 has plural, circular passages 84 spaced apart in its top wall. These passages in turn lead to the passages 86 disposed in the filter unit base plate 54.

The chamber 97 defined by side walls 99 is in direct communication with the interior of the standpipe 58 from which the chamber 97 receives dry air. The chamber 97 includes a tapped opening 88, the generally radial surfaces of which form a valve seat 90 having a reduced diameter passage 92 therein. Also disposed in the tapped opening 88 is a fitting 94 which serves to locate the body of a valve 96 containing a very small bleed orifice 98 in the nose portion thereof. The bleed orifice 98 is much smaller than the passage 92.

The valve 96 is biased into a closed position by a relatively weak spring 100. The fitting 94 may in turn accommodate another fitting 102 that acts to hold the valve 96 in place. The second fitting 102 has a central passage 104 therein for allowing dry air to exit.

Located beneath and firmly secured in air-tight relation to the valve housing 60 is a lower assembly 106. This lower assembly 106 includes a tapped opening 108 for receiving a fitting 110 serving to provide an opening 112 for the moist air supply 34 coming from the compressor (not shown). This central opening 112 is designed to communicate with a vertically extending bore 114 partially closed by a valve seat 116 held in place by a fitting 118 having an opening 120 in the top portion thereof. An opening 122 of about the same size is also present in the valve seat 116.

A valve assembly 124 is shown as being open to admit moist high pressure air from the compressor. The valve assembly 124 includes a valve nose 126, a rectangular groove 128 to permit air to flow around it, and an enlarged piston portion 130. A spring 134 urges the body of the valve upwardly with a very light spring pressure. This force is sufficient to close the valve under neutral or zero pressure, but not enough to keep the valve closed when the force of incoming air is exerted on the grooved surface 128 of the valve 124.

Referring again to the lower part of the assembly 106, this element also includes a bore 142 having a central passage 144 therein. This passage 144 leads in turn to a closed passage portion 147 of the valve body 146 that actuates the body 146 in response to pressure in the passage 147.

This body portion 146 is urged to the right as shown in FIG. 2 by a spring 148. A washer 150 held in place by a screw 152 holds the rubber valve 154 against the seat 156 forming a part of the valve shroud 157. The stem of the valve 146 and its washer 150 end in a vertically extending recess 158 formed in the lower housing 116. A second vertical passage 160 in the lower housing 106 accommodates the threaded neck portion 162 of a muffler 164.

Referring again to the right-hand side of the large transverse bore 142 in the lower housing 106 is a body 143 secured in place within the lower housing 106 by fasteners 170. The body includes, in addition to the central passage 144, an upwardly directed passage 171 communicating with a companion passage 172 leading to the spring containing area 125 of the valve assembly 124. When the air pressure supplied via line 42 opens the valve 152 to permit the vapor and the water to drain, the pressure also supplements the spring force serving to push the valve 124 to an upward position, locking out moist air, at the same time the valve stem 146 is moved off its seat 156.

Referring now to the spool valve assembly 32 of the MLT generally designated 31, this unit is shown to include a timer portion 30 of conventional construction activated by an electrical connection 200. Within the body is an extension of the actuator for an electromagnetically operated solenoid 202 which operates a spool valve generally designated 204. The spool valve 204 has two lands 206, 208 defining a groove 207 therebetween. These operate to cover or uncover ports 212, 214 and also allow the air pressure in the lines served by these ports to be exhausted when the ports are not pressurized. Thus, the ports are either pressurized or vented to the atmosphere.

In the position shown, the valve body is shifted to the right, moving the land 208 out of engagement with the port 214 and registering the opening in the spool with the passage 214. This action also uncovers the port 212, and allowing it to exhaust the air therein through the passage 213 and to the atmosphere.

When the spool 204 is moved in the opposite direction, the land 206 moves to the far left, uncovering the port 214, so the passage is then vented to the atmosphere through port 215. At the same time, the land 206 has moved so as to pressurize the port 212 with dry air.

The two outlet ports 212, 214 on the valve body 222 are equipped with fittings generally designated 224, 226 which may be fastened tightly to the valve body 222. The fitting 228 fastens the member containing an inlet passage 225 to the bottom of the MLT valve. The purpose of the spool valve operated by electricity is to take from the large amount of dry air supplied to the application via line 227 a small amount of dry air, and furnish this air, for example, to the line 44 to pressurize this line. This operates to open the drain valve. Thus, the MLT determines which of lines 42, 44 is to be activated, with the other line automatically therefore being bled to enable the moist air to drain out the passage in the bottom of the housing 106.

Figure 4:
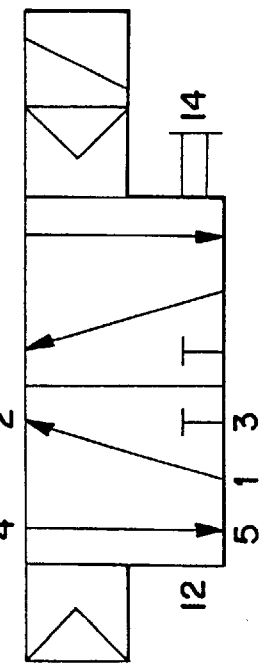
FIG. 4 is a schematic view of the valve unit of FIG. 3.

A schematic of the MLT valve is shown in FIG. 4. Here, the valve is shown having ports 1–5. With the spool in the right-hand position, the air in port 1 (bottom) pressurizes port 2 (top) while allowing port 4 (top) to bleed into port 5 (bottom). With the spool in the left-hand position, the right-hand port (top) is vented to the bottom while air pressure is supplied from the central port (bottom) to the left-hand port at the top. The numbers 12 and 14 are solenoid positions indicating the movement of the spool or valve core to the left and right, as indicated.

Figure 5:
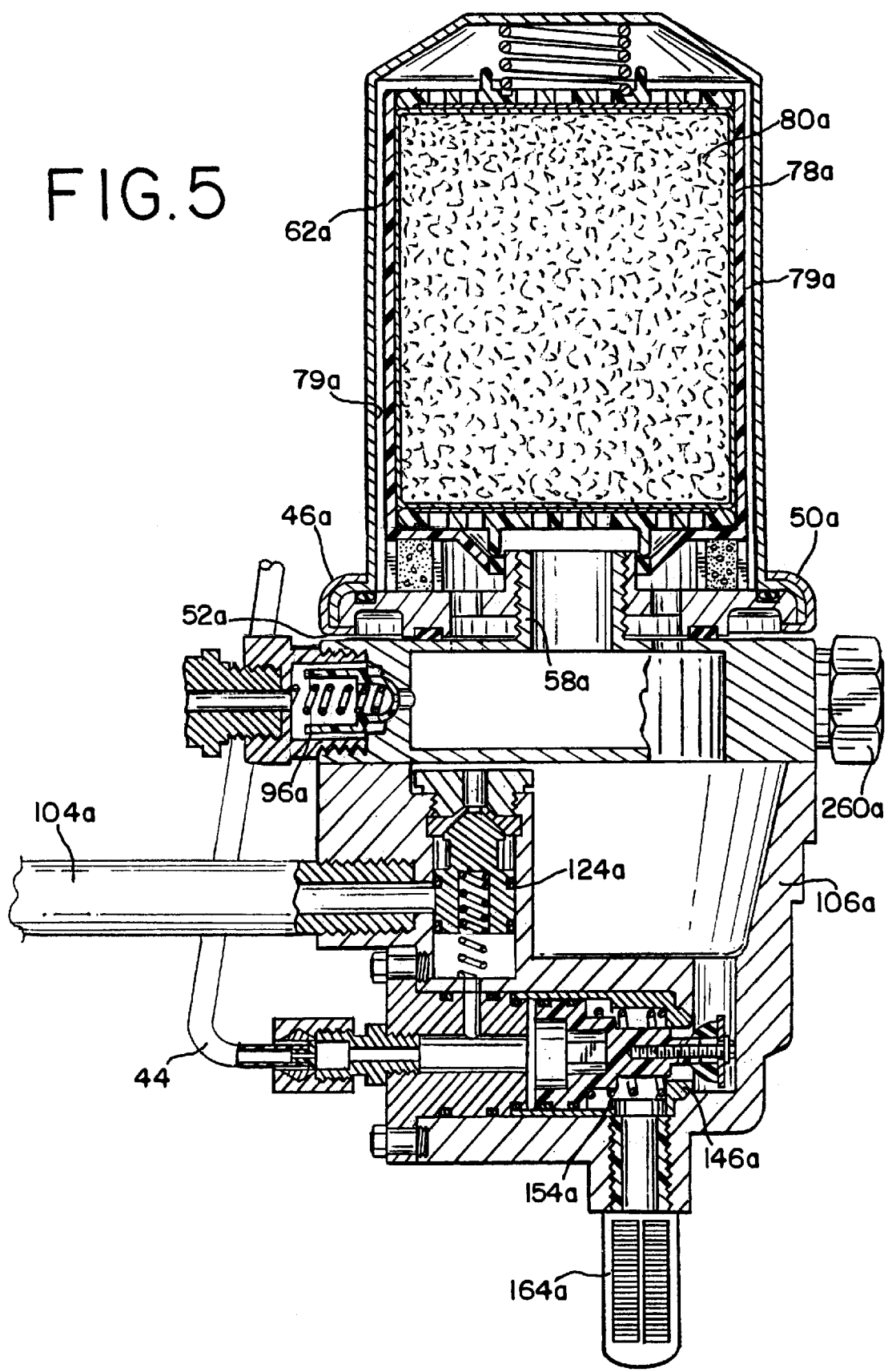
FIG. 5 is an enlarged vertical sectional view of the right-hand desiccator, showing the same in the regenerative mode, it being understood that this desiccator is in this mode approximately half the time.

Referring now to FIG. 5, the right-hand side air dryer unit 24 includes components which are all similar or identical to their counterparts in the right-hand desiccator, including the sleeve 62a holding the bag 78a of desiccant 80a. The housing 46a includes a ring 50a with a rolled, inwardly directed margin 52a and this assembly also includes a bottom plate 54a having a center opening 56 which is threaded and thus capable of being screwed onto the standpipe 58a. The dry air outlet valve 96a, the moist air inlet valve 124a and the drain valve 154a are similar to their counterparts in FIGS. 1 and 2, as are the lead-in line 44, the passage 104a for moist air as well as the valve 146a and the housing 106a surrounding it. Likewise, the muffler 164a and its associated parts are also identical. These parts are named for their function when the desiccator is being used as a dryer, it being understood that these valves operate in their other positions when the desiccant is regenerated.

Referring now to the operation of the apparatus of the invention, reference is made to FIGS. 1, 2 and 5. Assuming that the MLT valve is actuated such that the spool 208 is shifted to the far right, and that moist air from the compressor is entering the passage 112, the pressure of this air from the compressor, acting on the grooved portion 128 of the valve 124, pushes the valve 124 off its seat 126, allowing a supply of moist air to pass through the opening 122. From here the moist air passes around the wall 99 and through the vertical passages 84 in the top of the housing 60 and the passages 86 in the base plate.

Since the bottom of the desiccant sleeve 62 is closed off by an imperforate wall 77, the air passes radially outwardly through the secondary filter 76 located in the spaces between the supporting feet 74, 76 and then into the space 79 outside the desiccant holder 62. From there, the moist air passes downwardly through the apertured plate 64 at the top of the desiccant bag 78, and through the bag 80, where substantially all of the moisture is removed therefrom. Once the moisture has been removed, the air passes downwardly as shown by the arrows through the central opening 57 in the standpipe 58. From here, the dry air escapes to the valve 96 which is then biased open by the air pressure, overcoming the closing force of the spring 100.

The dry air escapes through the passage 104, whence it enters the four-way valve, the large opening of which 230 supplies to the application, such as an air powered tool, a tank, or simply air hoses for operating a spray gun. Minor, control amounts of the pressurized air are sent by the valving arrangements just described to the control air line 44 to bias the valve 154*a* open. The amounts of bled air passing through the valve 96*a* is very small and limited by the bleed orifice in the valve 98*a*. The combination of the air pressure and the spring bias this valve 98*a* to a closed position.

However, the small bleed opening therein 98*a* sends sufficient dry air into the passage 57*a* in the standpipe 58 to the canister 24 to regenerate the desiccant. The air flows from the standpipe 57*a* in a reverse direction (relative to the direction of FIG. 2) and through the desiccant bag 80*a*. This initially dry air then absorbs the moisture contained in the desiccant and regenerates the desiccant cartridge, with the air then passing through the space 79*a* between the exterior housing 46*a* and the desiccant holding sleeve 62. Again, this is in a reverse direction relative to its movement during drying.

During this time, the spring 134 beneath the valve 124*a*, in conjunction with air pressure through the port 134*a*, has biased the moist air inlet valve 124*a* to its closed position. The control air passing through line 44 also biases the piston 146*a* to the right (as shown in FIG. 5) within the sleeve 166*a*. This action serves to move the valve 154*a* to the right and off its seat as shown in FIG. 5, thereby allowing the air in the lower housing 106a (which has by now regenerated the desiccant) to pass through the valve and ultimately out through the muffler 164*a*.

This cycle is completed after a suitable interval, say four minutes. Then the MLT valve is switched by the action of the controller 202. At this point, all valves assume their opposite positions, with control air then passing through the line 42 to bias the valve 154 open, at the same time such air assists the spring in biasing the valve 124 to the closed position. The lack of pressurized air bearing on the valve 96 permits this valve 96 to close. However, the bleed opening does allow passage of a slight amount of air, which passes in a reversed direction through the desiccant in the bag 78 in the opposite direction, and the moist air and accumulated moisture will be drained into the lower housing 106 and will pass through the valve 146 and through the muffler 164.

An illustrative construction has been described in detail. The construction of a spin on canister is preferred, especially one having an imperforate sleeve holding a bag of desiccant. However, the arrangement of these parts might be significantly different. The only requirement is that there be sufficient space to pass air through and over the desiccant in both directions. The screw-on canister has a number of advantages, although with two years or so of desiccant life, changing it would not be strictly necessary.

The sealing means for the inside and outside passages has been illustrated as a rubber gasket for the outside and a threaded connection for the inside. However, the construction of these parts may be altered, and any means of separating the moist air going in from the dry air coming out may be used.

Regarding the housing having the upper and lower compartments with the valves being located in their respective positions, this was also illustrated as the preferred embodiment. For example, the type and location of these valves could be altered considerably. The horizontal positioning of two of the air inlet-outlet valves is merely illustrative, as is the vertical positioning of the drain valve. As long as the passages are kept separate from each other and the moist air inlet and drain valve are on the same side of the desiccant, and are on the opposite side of the dry air valve, the arrangement will be satisfactory. It is believed that the drain valve, however, should be at the bottom of the housing.

An illustrative form of the control valve has been shown. While the electrical operation of such a valve is preferred, a pneumatically controlled timer and valve could be substituted. The spool construction has been illustrated, but any other type of single valve, or combination of two valves that would simultaneously bleed the air from the opposite control line would be satisfactory. Thus, as long as the arrangement simultaneously pressurizes one side and bleeds the other, satisfactory operation could be arranged. A high pressure indicator or the like could be placed in the opening, which is shown as being plugged by the fittings, 260, 260*a*.

The arrangement shown is not to scale. Accordingly, it will be understood that merely by way of example, the desiccant canisters are perhaps 6 inches in diameter and have a height of 10–12 inches. The lower body containing the valves is perhaps another 9–12 inches in height, including the muffler.

The body is arranged with mounting brackets so that the canisters may be removed and replaced while the remainder of the unit remains affixed to the wall or other mounting point. The dry air outlet can be directed an individual outlet or may supply a manifold from which a number of tools depend.

The preferred model uses steel for the canister, with plastic internals and an aluminum bottom plate. The valve body is preferably aluminum, with the valves, seats, etc. being plastic, brass and/or aluminum.

It will thus be seen that the invention provides a new and improved dual cartridge air dryer having a number of advantages and characteristics including those expressly pointed out here, and others which are inherent in the invention. An illustrative embodiment of the product of the invention having been shown and described, it is anticipated that variations to the described form of apparatus will occur to those skilled in the art and that such modifications and changes may be made without departing from the spirit of the invention, or the scope of the appended claims.

What is claimed is:

1. An air dryer having dual canister assemblies and comprising, in combination, first and second valve bodies, each containing a moist air inlet valve, a dried air outlet valve and an exhaust and drain valve assembly, first and second spin-on canister assemblies removably attached to said valve bodies, a single control valve assembly and lines connecting a source of moist compressed air to both said moist air valve bodies, a pair of lines connecting said control valve to each of said exhaust and drain valve assemblies and a line connecting said dried air outlet valves to each other, to the application, and to said control valves for determining the position of said exhaust valves, said moist air inlet valves each being responsive to high external air pressure for biasing said valves open, said dried air outlet valves being biasable under high internal air pressure to an open position to allow dried air to escape from said canisters, and each of said dried air outlet valves having a small orifice therein to allow air to bleed therethrough when said valves are closed, said exhaust and drain valve assemblies being normally closed and being responsive to positive air pressure by opening to allow air and moisture to drain therethrough, each of said canister assemblies having a base plate, a housing fastened to said base plate, an imperforate sleeve being spaced from the inside of said housing, desiccant contained in said sleeve, with at least one aperture in said canister communicating with said moist air space and at least one aperture in said canister leading to said dried air space, whereby, when moist air acts on said one moist air valve to open said moist air valve and causes dry air to exit from said one of said dry air valves, said control valve supplies pressure to said other exhaust and drain valve to open said valve, said other moist air valve closes and bleed air passes backward through said other dry air valve to regenerate said desiccant, and moist air passes out through said other exhaust and drain valve assembly, and when said control valve supplies pressure to said one exhaust and drain valve assembly, said operating cycle reverses.

2. An air dryer as defined in claim 1, wherein said desiccant is a molecular sieve type desiccant.

3. An air dryer as defined in claim 1, wherein said desiccant is a finely divided powder contained in a bag.

4. An air dryer as defined in claim 1, wherein said each of said moist air inlet valves includes a low force spring for assistance in closing said valves.

5. An air dryer as defined in claim 1, wherein said dried air outlet valves biasable to an open position include light force springs urging them to a closed position in the absence of pressure.

6. An air dryer as defined in claim 1, wherein each of said moist air inlet valves includes a body having an enlarged piston portion forming the lower position thereof, a circumferential groove centrally of said body, and a reduced diameter nose portion adapted to engage a valve seat when said valves are in the closed position.

7. An air dryer as defined in claim 6, wherein said moist air inlet valve assemblies are adapted to reciprocate within a vertically extending bore.

8. An air dryer as defined in claim 1, wherein said dry air outlet valves include a body portion and a plurality of centering ribs, whereby, when said valve bodies are pushed off their seats, air may escape around the outside periphery of said valves.

9. An air dryer as defined in claim 5, wherein said dry air outlet valves are adapted to move horizontally.

10. An air dryer as defined in claim 1, wherein said exhaust and drain valves lie within a passage that includes a muffler assembly therein to reduce the noise associated with air being exhausted from said dryer.

11. An air dryer as defined in claim 1, wherein said exhaust and drain valve assemblies are positioned for movement in a horizontal plane.

12. An air dryer as defined in claim 1, wherein said exhaust and drain valve assembly includes an outer cylindrical member including a valve seat, a reciprocable cylindrical inner piston member carrying a valve head on a portion thereof, a spring biasing said valve head onto said valve seat, and having a blind, pressure-receiving opening on the other end thereof, said valve being normally closed in use.

13. An air dryer as defined in claim 12, which includes a passage extending from said blind passage side of said piston to the underside of said moist air inlet valve, whereby, with pressure being exerted on said exhaust and drain valve, said moist air inlet valve is also biased to the closed position.

14. An air dryer as defined in claim 1, wherein each of said sleeves includes foraminous top and bottom covers.

15. An air dryer as defined in claim 14, which further includes a spring biasing said foraminous top cover onto said desiccant within said cylindrical sleeve.

16. An air dryer as defined in claim 1, in which said space including at least one aperture communicating with said moist air space includes a pair of feet formed on the exterior of said cylindrical sleeve, said space receiving a filter between them.

17. An air dryer as defined in claim 1, wherein said aperture leading to said dried air space is in the form of a standpipe extending between the interior of said sleeve and said dried air outlet valve.

18. An air dryer as defined in claim 1, wherein said single control valve assembly is solenoid operated.

19. An air dryer as defined in claim 1, wherein said single control valve assembly is a spool type valve.

20. An apparatus for drying compressed air used to operate air tools and the like, said apparatus comprising, in combination, a pair of substantially identical, left and right hand air dryer units, each unit comprising, in combination, a housing having a moist air inlet, a valve for opening and closing said moist air inlet, a dry air outlet including a valve therein responsive to internal pressure for allowing dried air to escape from said unit, said valve also including a small bleed orifice to permit dry air to enter in the opposite direction, and an exhaust valve responsive to an applied pressure for opening the interior of said housing to allow moist air and liquid water to exit therethrough, and a canister unit adapted to be secured on top of said housing, said canister including imperforate exterior walls and walls defining a receiver for desiccant, a charge of desiccant received therein, at least one space leading from said moist air inlet to said desiccant and a space leading from said desiccant to said dry air outlet, and a control valve having an element movable between two positions to control the operation of said exhaust valve, said control valve including a connection thereto for permitting dry air to flow from either of said dry air outlets to one or the other of said drain valves, and allow pressure in the other line to be exhausted, and an actuator for moving said valve element between positions.

21. An apparatus as defined in claim 20, wherein said walls defining said receiver are cylindrical side walls and a bottom wall with a central opening therein.

22. An apparatus as defined in claim 21, wherein said cylindrical side walls further include a pair of bottom, discontinuous walls spaced apart radially and including a filter placed between them.

23. An apparatus as defined in claim 20, wherein said charge of desiccant includes a powdered desiccant received in a bag contained within said receiver for said desiccant.

24. An apparatus as defined in claim 23, which further includes a foraminous top cover and a spring biasing said top cover downwardly against said bag.

25. An air dryer system for use with power tools and the like, said system comprising two substantially identical air dryer units, each including in one mode, a moist air inlet, a dry air outlet, a moist air valve, a dry air valve, and a drain valve assembly, a valve assembly for controlling the flow of control air, and a piping system for directing air into and out of said air dryer units in alternate cycles, each of said dryers being adapted to pass air therethrough in opposite directions, said substantially identical air dryer units each including a canister including an imperforate outer shell, an inner shell with substantially imperforate side walls, a charge of desiccant received within said inner shell, a passage between said interior of said inner shell and said dry air outlet, and a drain valve in a lower housing, said drain valve being responsive to air pressure to allow moist air and liquid water to drain therethrough, said control valve being adapted to supply air pressure to said drain valve to actuate said drain valve and at the same time, said control valve being further adapted to relieve the pressure on said other drain valve, whereby, in one position of said control valve, said apparatus admits moist air which is directed through said desiccator and out the dry air outlet to the application at the same time a small part of said dry air passes through said dry air valve in the opposite direction, and through said desiccator in the opposite direction, taking moisture through said space between said shells and directing it to said exhaust valve while said moist air inlet valve is shut.

* * * * *